United States Patent Office 2,815,290
Patented Dec. 3, 1957

2,815,290

MOLD COATING COMPOSITION

Walter P. Green, Jr., and Walter N. Meek, Jr., Laurel, Miss., assignors to Masonite Corporation, Laurel, Miss., a corporation of Delaware No Drawing. Application February 26, 1953,
Serial No. 339,173

1 Claim. (Cl. 106—38.23)

This invention relates to the art of casting metals and relates particularly to the preparation and use of an improved mold coating composition. More particularly, the invention relates to a novel class of mold coating compositions comprising a major proportion of the water-soluble material obtained from thermally hydrolyzed lignocellulose together with a minor proportion of a surface active agent. The invention relates to the novel compositions themselves, to the method of their manufacture, and to their use in the coating of metal mold cavities.

In the pouring of high melting point metals such as steel and the like, the surfaces of the castings are usually rough and irregular and contain oxidized occlusions. It is therefore necessary that the rough castings be subjected to milling, scarfing, and the like manual operations in order to remove these irregularities. Considerable expense is involved in these operations both from the viewpoint of labor costs and from the loss of metal in the operations. Accordingly, many efforts have been made to provide a coating on the surfaces of the mold cavities with the intention of preventing splashing of the molten metal and of obtaining cast articles having smooth and regular surfaces. Some of these heretofore developed coating compositions have been employed more or less successfully. However, many of the prior art coating compositions have been undesirable due to the emission of toxic and nauseous gases during their use.

It is an object of the present invention to provide an improved mold coating composition suitable for use in the casting of high melting point metals.

It is a further object of the invention to provide an improved mold coating composition prepared from the water-soluble material obtained from thermally hydrolyzed lignocellulose together with small amounts of a preferred class of surface active agents.

Another object of the invention resides in the provision of such a mold coating composition characterized by its freedom from emission of undesirable gases during its use.

In the manufacture of lignocellulose fiber boards, wood, woody materials obtained from corn stalks, cane, and other vegetable growths may be subjected to fibration and varying degrees of hydrolysis by treatment with steam. One such method is described in United States Patent No. 1,824,221 to Mason, issued September 22, 1931. In this method, relatively small wood chips are subjected to pressures of about 200–1200 p. s. i. at temperatures of about 200°–300° C. for approximately 30 seconds to 5 seconds, respectively, in the presence of steam. The woody material is then discharged from the treatment chamber through a constricted opening into a zone of lower pressure, thereby exploding the wood chips into comparatively finely divided elongated fibers and bundles of fibers. This thermohydrolytic treatment renders a portion of the wood water soluble while other fractions thereof become dispersible or suspendible in water. The water solubles, including those materials suspended or dispersed, are composed substantially of about 60–80% of hexosans and pentosans, 5–25% of lignin, 5–15% of non-sugar carbohydrates, and 2–8% of gums. These water-soluble materials may be used in their crude condition for a number of purposes although they are preferably concentrated to about 50–55% by weight of solids before using. Such concentrated aqueous solutions are sold under the trademark "Masonex." The dried water-soluble material, ordinarily in powdered form, is sold under the trademark "Masonoid." As hereinbefore stated, only a minor proportion of the water-soluble material consists of lignin and gums. The major proportion thereof, which is of a carbohydrate nature, consists of an oligosaccharide mixture containing primarily mannose, arabinose, galactose, glucose, and xylose sugar units. Frequently, in the commercial manufacture of the water-soluble material, the aqueous mixture is filtered prior to concentration and/or drying. Most of the gums and lignin are thereby removed inasmuch as these materials constitute the larger proportion of the suspended constituents. In the following description of the invention, the term "water-soluble material" refers to both filtered and unfiltered water solubles and the starting material of the invention may therefore contain a greater or lesser amount of lignin and gums.

Briefly, the invention resides in the discovery that an improved mold coating composition may be prepared from the above described water-soluble material and a surface active agent selected from the group hereinafter set forth and described. It has been found that compositions containing a major proportion, i. e. from about 99.5% to about 92% of the water-soluble material together with a minor proportion, i. e. from about 0.5% to about 8% or more of the selected surface active agent provide a mold coating composition possessing outstanding advantages over the coating compositions heretofore emplyed by the art. One of the outstanding advantages obtained by the use of these novel compositions stems from the fact that during use thereof at elevated temperatures there is no emission of toxic or nauseous gases such as has been the case in the use of previously known mold coating compositions and particularly in the use of the commonly employed asphalt-containing compositions. It is a known fact that asphaltic coating compositions, when employed at temperatures in common usage in the art such as, for example, temperatures within the range of from about 500° F. to about 700° F. or higher, emit polycyclic aromatic hydrocarbons which constitute a distinct hazard to the workmen employing them. Another advantage to be derived from the use of the novel mold coating compositions of the invention resides in the provision of protective films over the mold cavity surfaces. These films are characterized by their uniformity, toughness, and freedom from blisters and the like irregularities.

In a generic sense, the class of surface active agents suitable for use in the invention include the non-ionic agents as well as some specific cationic and anionic agents. More specifically, the preferred non-ionic surface active agents include ethylene oxide polymers having molecular weights within the range of from about 3000 to about 8000, preferably an average molecular weight of from 4000 to 6000, and the products of condensation of ethylene oxide and fatty acids, fatty alcohols, alkyl phenols, and the like condensation products. Various of the silicone polymers have also been found suitable in the invention. In addition, such surface active agents as sulfonated fatty acids are useful as are the mono alkyl and dialkyl sulfosuccinates. Small amounts of these surface active agents as, for example, from about 0.5% to about 8% or slightly more by weight together with from about 99.5% to about 92% of the water-soluble material, comprise the novel mold coating compositions of the invention.

In preparing the novel mold coating compositions, the selected quantity of surface active agent is thoroughly mixed with the water-soluble material, after which the composition is ready for use. A preferred method of preparing the compositions consists in adding the surface active agent to a relatively concentrated aqueous solution of water-soluble material followed by flash evaporation of the water as by spray drying or the like means. This method of preparation, it is believed, may result in some reaction between the two constituents inasmuch as films prepared therefrom are noticeably stronger than where the two materials are mechanically mixed in dry condition. In any event, the dried mixture is preferably applied to the mold cavity surfaces in the form of an aqueous solution containing from about 10% to about 50% of solids and more preferably from about 30% to about 35% of solids. The exact manner in which the surface active agent functions in the mold coating composition is not understood. However, most of the surface active agents described above are anti-foaming agents and one of the advantages derived from their use resides in the diminution or, in some cases, the complete elimination of foaming of the coating composition during its application. In addition to the utility of the above described surface active agents per se, it has also been found that in some instances it is advantageous to use mixtures of the surface active agents. For example, some of the derivatives of tall oil and tallow have been found to increase the beneficial action of others of the surface active agents and this feature of the invention will hereinafter be more fully described.

The invention will be further described by the following specific examples. It should be borne in mind, however, that the examples are given for illustrative purposes alone, the invention being limited only by the scope of the appended claims.

*Example 1*

To an aqueous solution containing 500 parts (50%) by weight of water-soluble material was added 40 parts (8%) by weight of an ethylene oxide polymer having an average molecular weight of 4000. The mixture was stirred to form a uniform solution. Thereafter the solution was spray dried. The spray dried material was then employed as a mold coating composition as an aqueous solution containing 35% of solids. Steel rods, heated to 580° F., 660° F., and 730° F., respectively, were dipped in this solution for a period of 10 seconds each. The rods were then placed on a heated metal plate to dry. Within about 2 minutes the coating had dried and formed, in each instance, a uniform, tough, and non-tacky film. The above method of testing mold coating compositions is one which is commonly employed in the art. However, when heated steel molds were similarly coated by filling the cavities thereof with the solution and then draining, similar films were obtained. Upon casting molten steel in the coated molds, exceptionally good surfaces were obtained in the casting. It was apparent during the casting operation that the novel coating compositions had prevented splashing of the molten metal with the result that there was little or no necessity for milling of the cast article. It is believed that this improved casting results from the uniform gassing of the coating agent during the casting operation.

*Example 2*

The procedure of Example 1 was repeated except that 20 parts (4%) by weight of the surface active agent was employed. The protective films obtained were almost as good as those obtained in Example 1. At 575° F. and 625° F. good coats were obtained with 2%, 1% and 0.5%.

When the above procedures were repeated with 4% and 8% respectively of an ethylene oxide polymer having an average weight of 6000, protective films were obtained which were very similar to those of Examples 1 and 2.

*Example 3*

The procedure of Example 1 was repeated employing, respectively, 8%, 4%, 2%, and 1% of a surface active agent in which the active ingredient is sulfonated tallow. The protective films, in each instance, were entirely satisfactory although it was noted that the adhesion of the film to the steel rods decreased as the amount of surface active agent was decreased.

*Example 4*

To an aqueous solution containing 500 parts (50%) by weight of water-soluble material was added, respectively, 20 parts (4%), 10 parts (2%), 5 parts (1%), and 2.5 parts (0.5%) of a condensation product of ethylene oxide and tall oil. The solutions were thereafter employed as in Example 1, in the preparation of protective films on heated steel rods to determine the maximum operative temperatures employable. The sample containing 4% of the surface active agent was most effective at coating temperatures below 660° F. while the best results with 0.5% of agent were obtained at somewhat lower temperatures. In all instances, however, the protective films were entirely satisfactory.

*Example 5*

The procedure of Example 4 was repeated employing respectively, 8%, 4%, 2% and 1% of a condensation product of ethylene oxide and an alkyl phenol. All of the samples resulted in completely satisfactory protective films characterized by a fine grained appearance. The sample containing 8% of the surface active agent foamed the least, although none of the samples exhibited excessive foaming. 0.5% of a similar material gave a good coat at not above 625° F.

*Example 6*

The procedure of Example 4 was repeated employing respectively, 8% and 4% of an ethylene oxide condensation product of tertiary octyl phenol which had been sulfonated to increase its water solubility. Both of the samples resulted in the formation of good protective films and exhibited little foaming.

*Example 7*

The procedure of Example 4 was repeated employing, respectively, 8%, 4%, 2%, and 1% of a surface active agent in which the active ingredient was a silicone polymer. The protective films, in each instance, were entirely satisfactory, although it was noted that the adhesion of the film to the steel rods decreased when only 1% of the surface active agent was used.

*Example 8*

The procedure of Example 4 was repeated employing 0.5%, respectively, of each of the following surface active agents:

(1) Fatty acid amide (Aerosol C-61, American Cyanamid Company)
(2) Polyglycol ether (Carbowax 1500 W, Carbide and Carbon Corporation)
(3) Polypropylene glycol
(4) Phosphate ester, i. e. tributyl phosphate
(5) Phosphate ester ether, i. e. tributoxy phosphate
(6) High molecular weight olefinic alcohol, i. e. oleoyl alcohol
(7) Mixture of fatty acid glycerides and hydrocarbons (Nopco KF, Nopco Chemical Company)

The protective coatings obtained were uniformly satisfactory, indicating that all of the above surface active agents may suitably be employed in the present invention.

*Example 9*

The procedure of Example 4 was repeated employing the following mixtures of surface active agents:

(1) Mixture of stearyl alcohol and polyethylene glycol (2) Mixture of the product of reaction of lauric acid with ethylene oxide having an average of 2 ethylene oxide units and a non-ionic tallow derivative. In this mixture, one part of the tallow derivative was employed for each 3 parts of the other component.

In both instances, satisfactory protective films were obtained.

*Example 10*

The procedure of Example 4 was repeated employing 4% by weight of a commercially prepared ethanolated alkyl guanidine amine. Good protective films were obtained at temperatures below 575° F.

In all of the foregoing examples, which represent the method commonly employed by the industry in testing mold coating compositions, there was a noticeable absence of objectionable and toxic gases during the drying of the films. The protective films were characterized by progressive gasification during the pouring of steel and the splashing of molten metal was thereby minimized while the ingot yield was greatly improved. It will therefore be seen that the present invention provides an advantageous method of preparing novel and improved mold coating compositions. The invention presents the advantage of affording mold coating compositions prepared from cheap raw material, and therefore presents to the industry a source of material which is of decided economic desirability. The invention further provides the advantage of mold coating compositions which do not emit undesirable gases during use and which, at the same time, afford coating films presenting decided improvements over those heretofore available to the art.

We claim:

An improved mold coating composition consisting essentially of from about 99.5% to about 92% of the water-soluble material obtained from thermally hydrolyzed lignocellulose together with from about 0.5% to about 8% of an ethylene oxide polymer having an average molecular weight of from 4000 to 6000.

References Cited in the file of this patent

UNITED STATES PATENTS

| | | |
|---|---|---|
| 2,234,152 | Archer | Mar. 4, 1941 |
| 2,288,736 | Osserman | July 7, 1942 |
| 2,499,028 | Kunze | Feb. 28, 1950 |
| 2,549,535 | Skooglund | Apr. 17, 1951 |
| 2,549,822 | Koonce | Apr. 24, 1951 |
| 2,623,809 | Myers | Dec. 30, 1952 |

OTHER REFERENCES

General Electric Review Silicone Oils; part II, their application, December 1946, vol. 49, No. 12, 7 pages, page 6 relied on.

Lewis: "Lignin—An Economic Liability or a Chemical Asset," Chem. and Eng. News, June 1945 (page 1076 relied on).

Thomas: "Emulsions," American Leather Chemists Ass'n. Journal, vol. 22 (1927), (pp. 173, 183, 187 relied on).

Alexander; "Colloid Chemistry," vol. VI, pub. by Reinhold (1946), (p. 288 relied on).